(12) United States Patent
Gillespie et al.

(10) Patent No.: US 7,998,384 B2
(45) Date of Patent: *Aug. 16, 2011

(54) SPUNBOND NONWOVEN FABRICS FROM RECLAIMED POLYMER AND THE MANUFACTURE THEREOF

(75) Inventors: Jay Darrell Gillespie, Simpsonville, SC (US); Daniel Deying Kong, Vancouver, WA (US); Robert C. Alexander, Brush Prairie, WA (US)

(73) Assignee: Fiberweb Simpsonville, Inc., Simpsonville, SC (US)

( * ) Notice: Subject to any disclaimer, the term of this patent is extended or adjusted under 35 U.S.C. 154(b) by 1122 days.

This patent is subject to a terminal disclaimer.

(21) Appl. No.: 09/921,323

(22) Filed: Aug. 2, 2001

(65) Prior Publication Data
US 2003/0032357 A1    Feb. 13, 2003

(51) Int. Cl.
*D01D 5/30* (2006.01)
*D02F 8/11* (2006.01)
*D04H 3/00* (2006.01)
*D04H 3/16* (2006.01)

(52) U.S. Cl. ......... 264/172.11; 264/171.1; 264/171.11; 264/172.12; 264/172.13; 264/172.15; 442/361; 442/362; 442/364; 442/401

(58) Field of Classification Search .............. 264/555, 264/171.1, 171.11, 172.11, 172.12, 172.13, 264/172.14, 172.15, 165; 604/358; 428/369, 428/370, 373, 374; 442/327, 401, 361–364
See application file for complete search history.

(56) References Cited

U.S. PATENT DOCUMENTS

| 5,162,074 A | * | 11/1992 | Hills ............................ 216/83 |
| 5,344,297 A | | 9/1994 | Hills |
| 5,443,898 A | * | 8/1995 | Gessner et al. .............. 442/361 |
| 5,466,410 A | | 11/1995 | Hills |
| 5,549,957 A | | 8/1996 | Negola et al. |
| 5,783,503 A | | 7/1998 | Gillespie et al. |
| 5,814,349 A | * | 9/1998 | Geus et al. ..................... 425/66 |
| 5,885,705 A | * | 3/1999 | Kent et al. .................... 428/373 |
| 6,410,138 B2 | * | 6/2002 | Mleziva et al. .............. 428/369 |

(Continued)

FOREIGN PATENT DOCUMENTS

EP    0916751 A2    5/1999

(Continued)

OTHER PUBLICATIONS

Handbook of Fiber Chemistry, 3rd Edition, Taylor and Francis, copyright 2006, Chapter 3.6, 3.7.*

(Continued)

*Primary Examiner* — Angela Ortiz
*Assistant Examiner* — Jennifer Steele
(74) *Attorney, Agent, or Firm* — Alston & Bird LLP

(57) ABSTRACT

A spunbond nonwoven fabric useful as a topsheet is produced from polypropylene filaments including a high level of reclaimed polypropylene, while maintaining a product quality, including superior formation, comparable to that obtained when using 100 percent virgin polymer. The spunbond nonwoven fabric is made with multicomponent filaments having at least two different polymer components occupying different areas within the filament cross section, and wherein one of the polymer components comprises reclaimed polypropylene recovered from previously spun polypropylene fiber or webs comprised of previously spun polypropylene fiber. In a specific embodiment, the filaments are sheath-core bicomponent filaments and the reclaimed polypropylene is present in the core component. The core of the bicomponent filament can be comprised of up to 100% reclaimed polypropylene.

10 Claims, 1 Drawing Sheet

U.S. PATENT DOCUMENTS 6,737,009 B2 * 5/2004 Taylor et al. .................. 264/555
2001/0008965 A1 7/2001 Kinn et al.

FOREIGN PATENT DOCUMENTS

| | | |
|---|---|---|
| JP | 2001172827 | 6/2001 |
| JP | 2001172828 | 6/2001 |
| WO | WO 99/16947 | 4/1999 |
| WO | WO 00/08243 | 2/2000 |
| WO | WO-00/41254 A1 | 7/2000 |

OTHER PUBLICATIONS

Gardner, "Today's Changes in Bicomponent Fibers", *America's Textiles International*, May 1995, pp. 8-12.

Wilkie, "Economics and Technology of Polypropylene Fiber Production", *Clemson University Conference on Polypropylene Technology*, Sep. 4, 1991.

"Reicofil—Reifenhauser's Spin-Bonding Process", *Allgemeiner Vliesstoff-Report I*, 1986, pp. 34-36.

Wehmann, "New Processes Offer Alternatives for Spunbonded Nonwovens", *Nonwovens World*, Nov. 1987, pp. 52-54.

Belk, "Reicofil and Melt Blown the New Way for Producing Composite Fabrics", *Scientific Reports*, p. 372.

"The Leaders in New Technologies", Reifenhauser GmbH & Co Maschinenfabrik, Jun. 5, 1998.

"ITS-Charts: Spunbond-Anlagen", *ITB Vliesstoffe Technische Textilien*, Feb. 1998, pp, 28-32.

Kunze, "Broadening the Use of Bicomponent Techniques to Improve the Economics of SMS and Spunlaid", *Insight 98, Fiber & Fabric Conference*, Oct. 12 & 13, 1998.

Ward, "Advance Technologies Feature at INDEX" *Show Watcher*, pp. 73-74.

Harris, "The Possibilities for Really Soft Nonwovens Using 0.5 Denier BICOmponent Spunbonds", *Insight 98*, Oct. 13, 1998.

* cited by examiner

SPUNBOND NONWOVEN FABRICS FROM RECLAIMED POLYMER AND THE MANUFACTURE THEREOF

FIELD OF THE INVENTION

This invention relates to improvements in the manufacture of spunbonded nonwoven fabrics, and more particularly to the use of recycled polymer in the manufacture of spunbond nonwoven fabrics.

BACKGROUND OF THE INVENTION

A major goal in the nonwovens industry is to reduce cost. At the same time there is growing concern in society about degradation of the natural environment. Disposal of solid waste is a major contribution to this growing environmental concern.

During the production of polypropylene nonwoven fabrics, significant waste polypropylene is generated during startup of the process, from trimming left when the nonwoven web is slit to customer's specification, and from rolls that may have been slightly damaged or otherwise out of specifications. This polypropylene waste, coming from previously spun polypropylene fiber and webs comprised of previously spun polypropylene fiber, can be safely sent to solid waste landfills. However since this is very clean polypropylene it can also be remelted for recycling back through the spunbonding process. Recycle thus meets two goals, saving of the cost of wasted polypropylene and reduced solid waste to downgrade the natural environment.

Recycling such polypropylene is well known in the nonwoven industry. However once the polypropylene goes through the spinning process it is partly degraded by oxidation so that the polymer molecular weight is reduced. This effect can be partly mitigated by the optimized addition of antioxidants. However some degradation is always seen. Such degradation can be seen by measuring the melt flow rate of the processed polymer. The melt flow rate will increase. The melt flow of polypropylene can be measured as taught in ASTM D-1238, at conditions of 230° C. and 2.14 kg.

Because of the reduced molecular weight, the recycled polypropylene is not generally suitable for being used by itself in the manufacture of spunbond nonwoven fabrics. Therefore, it is typically blended with virgin polypropylene. However, the amount of recycled previously spun polypropylene that can be recycled is limited. If too much recycled polypropylene is blended with the virgin resin, then an increase in the number of spinning breaks (broken filaments) will be seen. These broken filaments will cause quality defects in the finished spunbond nonwoven fabric or, in severe cases, a complete disruption of the manufacturing process. Second, the presence of too much recycled polypropylene can reduce the measured tensile strength of the resulting spunbond nonwoven fabric. For these reasons the amount of polypropylene recycled back through the process is usually limited to less than about 20% of the total polypropylene by weight.

SUMMARY OF THE INVENTION

The present invention makes it possible to use a high level of reclaim, while maintaining a product quality, including superior formation, comparable to that obtained when using 100 percent virgin polymer.

According to the present invention, a spunbond nonwoven fabric is made with multicomponent filaments having at least two different polymer components occupying different areas within the filament cross section, and wherein one of the polymer components comprises reclaimed polypropylene recovered from previously spun polypropylene fiber or webs comprised of previously spun polypropylene fiber. In a specific embodiment, the filaments are sheath-core bicomponent filaments and the reclaimed polypropylene is present in the core component. The core of the bicomponent filament can be comprised of up to 100% reclaimed polypropylene.

For producing the spunbond nonwoven fabric, we have developed a particular process which enables producing bicomponent filaments with high reclaimed polypropylene content and at the high speeds which are necessary for practical and economical commercial production. The spunbond nonwoven fabrics have superior formation and product quality.

According to the present invention, a process for producing spunbond nonwoven fabrics is provided, comprising the steps of: separately melting two or more polymeric components, at least one polymeric component including reclaimed polypropylene recovered from previously spun polypropylene fiber or webs comprised of previously spun polypropylene fiber; separately directing the two or more molten polymer components through a distribution plate configured so that the separate molten polymer components combine at a multiplicity of spinnerette orifices to form filaments containing the two or more polymer components; extruding the multicomponent filaments from the spinnerette orifices into a quench chamber; directing quench air from a first independently controllable blower into the quench chamber and into contact with the filaments to cool and solidify the filaments; directing the filaments and the quench air into and through a filament attenuator and pneumatically attenuating and stretching the filaments; directing the filaments from the attenuator into and through a filament depositing unit; depositing the filaments from the depositing unit randomly upon a moving continuous air-permeable belt to form a nonwoven web of substantially continuous filaments; applying suction from a second independently controllable blower beneath the air-permeable belt so as to draw air through the depositing unit and through the air-permeable belt; and directing the web through a bonder and bonding the filaments to convert the web into a coherent nonwoven fabric.

In a further, more specific, aspect, the present invention provides a process for producing a spunbond nonwoven fabric, comprising the steps of: reclaiming polypropylene from previously spun polypropylene fiber or webs comprised of previously spun polypropylene fiber; separately melting a first polymeric component comprising virgin polypropylene and a second polymeric component comprising the reclaimed polypropylene; separately directing the first and second molten polymer components through a distribution system configured so that the separate molten polymer components combine at a multiplicity of spinnerette orifices to form bicomponent filaments containing a core of the second polymer component and a surrounding sheath of the first polymer component; extruding the bicomponent filaments from the spinnerette orifices into a quench chamber; directing quench air into the quench chamber and into contact with the filaments to cool and solidify the filaments; directing the filaments and the quench air into and through a filament attenuator and pneumatically attenuating and stretching the filaments; directing the filaments from the attenuator into and through a filament depositing unit; depositing the filaments from the depositing unit randomly upon a moving continuous air-permeable belt to form a nonwoven web of substantially continuous filaments; and directing the web through a bonder and bonding the filaments to convert the web into a coherent nonwoven fabric.

The present invention also provides a spunbond nonwoven fabric produced by the above-described processes.

In a further aspect, the present invention is directed to a spunbond nonwoven fabric which includes substantially continuous multicomponent filaments having at least two different polymer components occupying different areas within the filament cross section, and wherein one of the polymer components comprises reclaimed polypropylene recovered from previously spun polypropylene fiber or webs comprised of previously spun polypropylene fiber. The spunbond nonwoven fabric is suitable for being used as components in hygiene applications, such as diapers and incontinent garments. The nonwoven fabrics show superior formation, as indicated by a coefficient of variation for air permeability of less than about 7 percent.

In a further specific embodiment, the spunbond nonwoven fabric includes substantially continuous sheath/core bicomponent filaments, the sheath component comprising polypropylene, the core component comprising reclaimed polypropylene having a melt flow rate at least 5 units higher than the sheath component.

In a specific embodiment, the initial handling, melting, and forwarding of the two or more polymer components is carried out in respective individual extruders. The separate polymer components are combined and extruded as multicomponent filaments with the use of a spin beam equipped with spin packs having a unique distribution plate arrangement available from Hills, Inc. and described in U.S. Pat. Nos. 5,162,074; 5,344,297 and 5,466,410. The extruded filaments are quenched, attenuated and deposited onto a moving air-permeable conveyor belt using a system known as the Reicofil III system, as described in U.S. Pat. No. 5,814,349. The web of filaments which is formed on the conveyor belt may be bonded, either in this form or in combination with additional layers or components, by passing through a bonder. The bonder may comprise a heated calender having a patterned calender roll which forms discrete point bonds throughout the fabric. Alternatively, the bonder may comprise a through-air bonder. The fabric is then wound into roll form using a commercially available take-up assembly

BRIEF DESCRIPTION OF THE DRAWING

The drawing FIGURE shows schematically an arrangement of system components for producing a bicomponent spunbonded nonwoven fabric in accordance with the present invention.

DETAILED DESCRIPTION OF THE INVENTION

Figure 1:
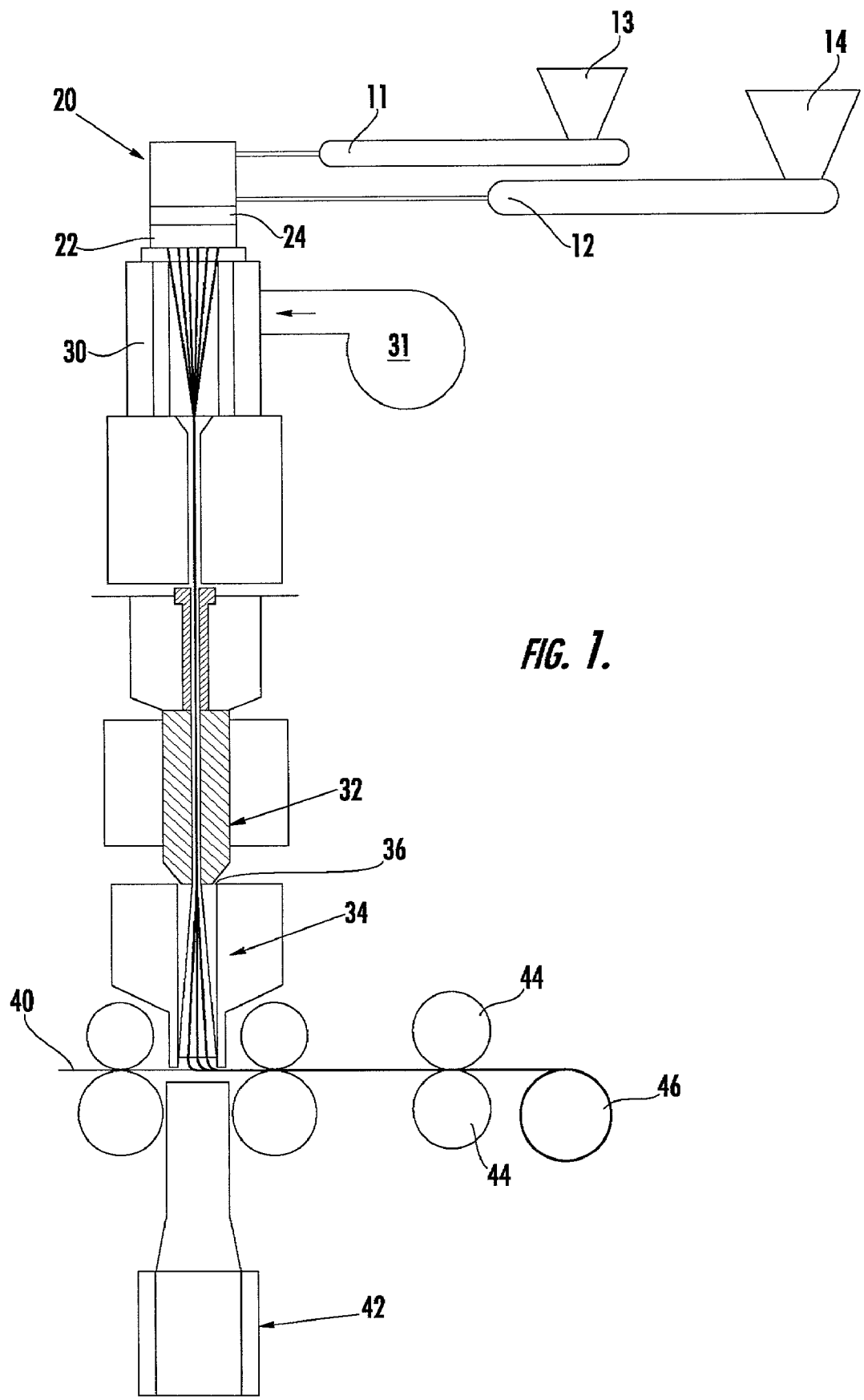

The present invention now will be described more fully hereinafter with reference to the accompanying drawing, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

The drawing FIGURE schematically illustrates the system components for carrying out the process of the present invention. In the illustrated embodiment, the system includes two extruders 11, 12 adapted for receiving and processing two separate fiber-forming polymer materials, typically received from the manufacturer in the form of polymer chip or flake. The extruders are equipped with inlet hoppers 13, 14 adapted for receiving a supply of polymer material in granular or flake form. The extruders include a heated extruder barrel in which is mounted an extruder screw having convolutions or flights configured for conveying the chip or flake polymer material through a series of heating zones while the polymer material is heated to a molten state and mixed by the extruder screw. Extruders of this type are commercially available from various sources. Alternatively, one or both of the extruders can be fed molten polymer from polypropylene obtained directly from polypropylene filaments or webs. For example, the extruder which is used for supplying polymer for the core component of a sheath/core bicomponent filament (e.g. extruder 12 in the drawing) can be equipped with an additional auxiliary feed extruder (not shown) which directly receives polypropylene webs or filaments and melts the webs or filaments in order to supply molten reclaimed polypropylene polymer to the barrel of the main extruder (e.g. extruder 12). The main extruder can be operated with 100 percent reclaimed polypropylene from this auxiliary feed extruder, or the reclaimed polypropylene can be blended with virgin polypropylene resin supplied from hopper 14.

A spin beam assembly, generally indicated at 20, is communicatively connected to the discharge end of each extruder for receiving molten polymer material therefrom. The spin beam assembly 20 extends in the cross-machine direction of the apparatus and thus defines the width of the nonwoven fabric to be manufactured. The spin beam assembly is typically several meters in length. Mounted to the spin beam assembly is one or more replaceable spin packs designed to receive the molten polymer material from the two extruders, to filter the polymer material, and then to direct the polymer material through fine capillaries formed in a spinnerette plate. The polymer is extruded from the capillary orifices under pressure to form fine continuous filaments. It is important to the present invention to provide a high density of spinnerette orifices. Preferably the spinnerette should have a density of at least 3000 orifices per meter of length of the spin beam, and more desirably at least 4000 orifices per meter. Hole densities as high as 6000 per meter are contemplated.

Each spin pack is assembled from a series of plates sandwiched together. At the downstream end or bottom of the spin pack is a spinnerette plate 22 having spinnerette orifices as described above. At the upstream end or top is a top plate having inlet ports for receiving the separate streams of molten polymer. Beneath the top plate is a screen support plate for holding filter screens that filter the molten polymer. Beneath the screen support plate is a metering plate having flow distribution apertures formed therein arranged for distributing the separate molten polymer streams. Mounted beneath the metering plate and directly above the spinnerette plate 22 is a distribution plate 24 which forms channels for separately conveying the respective molten polymer materials received from the flow distribution apertures in the metering plate above. The channels in the distribution plate are configured to act as pathways for the respective separate molten polymer streams to direct the polymer streams to the appropriate spinnerette inlet locations so that the separate molten polymer components combine at the entrance end of the spinnerette orifice to produce a desired geometric pattern within the filament cross section. As the molten polymer material is extruded from the spinnerette orifices, the separate polymer components occupy distinct areas or zones of the filament cross section. For example, the patterns can be sheath/core, side-by-side, segmented pie, islands-in-the-sea, tipped profile, checkerboard, orange peel, etc. The spinnerette orifices can be either of a round cross section or of a variety of cross sections such as trilobal, quadralobal, pentalobal, dog bone shaped, delta shaped, etc. for producing filaments of various cross section.

The thin distributor plates 24 are easily manufactured, especially by etching, which is less costly than traditional machining methods. Because the plates are thin, they conduct heat well and hold very low polymer volume, thereby reducing residence time in the spin pack assembly significantly. This is especially advantageous when extruding polymeric materials which differ significantly in melting points, where the spin pack and spin beam must be operated at temperatures above the melting point of the higher melting polymer. The other (lower melting) polymer material in the pack experiences these higher temperatures, but at a reduced residence time, thus aiding in reducing degradation of the polymer material. Spin packs using distributor plates of the type described for producing bicomponent or multi-component fibers are manufactured by Hills Inc. of W. Melborne Fla., and are described in U.S. Pat. Nos. 5,162,074, 5,344,297 and 5,466,410, the disclosures of which are incorporated herein by reference.

Upon leaving the spinnerette plate, the freshly extruded molten filaments are directed downwardly through a quench chamber 30. Air from an independently controlled blower 31 is directed into the quench chamber and into contact with the filaments in order to cool and solidify the filaments. As the filaments continue to move downwardly, they enter into a filament attenuator 32. As the filaments and quench air pass through the attenuator, the cross sectional configuration of the attenuator causes the quench air from the quench chamber to be accelerated as it passes downwardly through the attenuation chamber. The filaments, which are entrained in the accelerating air, are also accelerated and the filaments are thereby attenuated (stretched) as they pass through the attenuator. The blower speed, attenuator channel gap and convergence geometry are adjustable for process flexibility.

Mounted beneath the filament attenuator 32 is a filament-depositing unit 34 which is designed to randomly distribute the filaments as they are laid down upon an underlying moving endless air-permeable belt 40 to form an unbonded web of randomly arranged filaments. The filament-depositing unit 34 consists of a diffuser with diverging geometry and adjustable side walls. Beneath the air-permeable belt 40 is a suction unit 42 which draws air downwardly through the filament-depositing unit 34 and assists in the lay-down of the filaments on the air-permeable belt 40. An air gap 36 is provided between the lower end of the attenuator 32 and the upper end of the filament depositing unit 34 to admit ambient air into the depositing unit. This serves to facilitate obtaining a consistent but random filament distribution in the depositing unit so that the nonwoven fabric has good uniformity in both the machine direction and the cross-machine direction.

The quench chamber, filament attenuator and filament-depositing unit are available commercially from Reifenhauser GmbH & Company Machinenfabrik of Troisdorf, Germany. This system is described more fully in U.S. Pat. No. 5,814,349, the disclosure of which is incorporated herein by reference. This system is sold commercially by Reifenhauser as the "Reicofil III" system.

The web of filaments on the continuous endless moving belt may be subsequently directed through a bonder and bonded to form a coherent nonwoven fabric. Bonding may be carried out by any of a number known techniques such as by passing through the nip of a pair of heated calender rolls 44 or a through-air bonder. Alternatively, the web of filaments may be combined with one or more additional components and bonded to form a composite nonwoven fabric. Such additional components may include, for example, films, meltblown webs, or additional webs of continuous filaments or staple fibers.

The polymer components for multicomponent filaments are selected in proportions and to have melting points, crystallization properties, electrical properties, viscosities, and miscibilities that will enable the multicomponent filament to be melt-spun and will impart the desired properties to the nonwoven fabric. At least one of the component is formed from reclaimed polypropylene recovered from previously spun polypropylene fiber or webs comprised of previously spun polypropylene fiber. The reclaimed polypropylene will have been subjected to at least two heat histories in which the polypropylene has been melted and resolidified: once when the virgin polypropylene resin (in pellet or flake from as received from the polymer manufacturer) was originally melted and extruded to form the original filaments and webs, and at least once again when the reclaimed polypropylene was remelted and formed into the filaments and webs of the present invention. In many instances, the polypropylene will have undergone an additional melting and resolidification when the waste polypropylene, in the form of the filaments or webs which are being reclaimed, is remelted and formed into pellets or flake suitable for processing in the extruders of the spunbond equipment. As a result of the prior heat histories, the reclaimed polypropylene exhibits a melt flow rate higher than that of virgin polypropylene, typically at least 5 melt flow units greater.

In one preferred embodiment, the multicomponent filaments are sheath-core bicomponent filaments, and the component containing the reclaimed polypropylene is present in the core of the sheath-core filament. This component can contain up to 100 percent by weight of the reclaimed polypropylene, thus making it possible to significantly increase the amount of reclaimed polypropylene incorporated into the filament. The sheath can contain 100 percent by weight virgin polypropylene resin, or blends of virgin polypropylene resin with a smaller amount of the reclaimed polypropylene than is present in the core. Because of the higher content of reclaimed polypropylene, the core component will have a melt flow rate higher than that of the sheath, typically at least 5 melt flow units greater than the sheath.

Preferably, the core component of the bicomponent filament will comprise from 25% to 75% of the filament by weight, and more desirably from 40% to 60% by weight of the filament. In such event, the reclaimed polypropylene will comprise 25 percent or more of the total filament, by weight.

By incorporating the reclaimed polypropylene in the core of the filament and surrounding it with a sheath of virgin polypropylene or a blend of virgin with reclaimed polypropylene, the spinning behavior of the filaments is comparable to that of monocomponent filaments formed entirely of the sheath composition. The process may be operated at speeds comparable to what is used in the normal production of a spunbond fabric formed of monocomponent filaments, and the operating efficiency and incidence of filament breaks is comparable. Also, the fabric physical properties and formation remain comparable to fabrics formed of conventional monocomponent filaments of virgin polymer. The nonwoven fabrics show superior formation, as indicated by a coefficient of variation for air permeability of less than about 7 percent.

Formation quality is a major concern for nonwoven fabrics used as components in baby diapers or adult incontinent diapers or briefs. Good formation allows manufacture to proceed at high speed without concern, for example, of adhesive bleeding through one layer of nonwoven fabric into another part of the diaper. One measure of formation is the ratio of the standard deviation of air permeability divided by the average of the air permeability, multiplied by 100 percent. This ratio is sometimes called the coefficient of variation. A nonwoven fabric showing a low coefficient of variation for air permeability will show a uniform distribution of the fibers in the web making up the nonwoven. A nonwoven fabric showing a poor distribution of fibers in the web would show a higher value for the coefficient of variation of the air permeability.

The spunbond fabrics of the present invention may be produced entirely of multicomponent or bicomponent filaments, or may be formed with a blend of reclaim-containing multicomponent or bicomponent filaments and conventional monocomponent filaments.

The following examples are provided to illustrate the present invention.

Example 1

Control

A spunbond machine was employed equipped with three successively arranged spinning beams (identified A, B and C), each spinning beam having an independent polymer distribution system and equipped with spinnerettes capable of producing sheath-core bicomponent filaments. In each of beams A, B and C the polymer component that formed the sheath of the bicomponent filament and the polymer component that formed the core of the bicomponent filament was comprised of virgin polypropylene resin (EXXON Resin PP 3155) so that the resulting filaments were comprised of 100% virgin polypropylene. The polymer feed rate to beams A, B and C was such that the beams produced a web of 0.40 ounces per square yard (13.8 grams per square meter) overall basis weight. The resulting web, which is not part of our invention, was composed of 100% virgin polypropylene polymer. The web was calender bonded with a patterned calender roll having 210 embossing points per square inch and having a 25% bond area. The fabric was then treated with surfactant to make the fabric fit for use as topsheet for adult incontinence diapers. The fabric was submitted to physical testing and the results are given in Table 1.

For the data given in Table 1, basis weight was measured generally following the method of ASTM D3776-96. MD and CD Tensile elongation, and toughness or TEA were measured generally following ASTM D5035-95 for testing 1-inch wide strips of nonwoven. The liquid transport properties of the fabric, important for fabrics used as topsheet for baby diapers or adult incontinent diapers or briefs, were evaluated using strike-through and rewet tests. Strike-through and rewet, or surface rewet, were evaluated by methods similar to those described in U.S. Pat. Nos. 4,041,951 and 4,391,869, incorporated herein by reference. Strike-through was measured as the time for 5 ml of a synthetic urine solution, placed in the cavity of the strike-through plate, to pass through the sample fabric into an absorbent pad. Surface rewet, reported in grams, was evaluated by adding synthetic urine through the sample fabric into the absorbent pad until the absorbent pad was nearly saturated. Thus, the sample was wet at the beginning of the test. A loading factor of approximately 4 grams of synthetic urine per gram of absorbent sample was used. a uniform pressure loading of 0.5 psi was then applied and the procedure was concluded as described in the above patents. Rewet in grams measures the weight of liquid that is transferred back through the topsheet from the core to a sheet of filter paper facing the topsheet when compressed under the 0.5 psi loading. The Hunter color of the fabric was measured generally following ASTM E-308 to yield an "L" value related to the lightness reflected off the surface, an "a" value related to redness (+) or greenness (−) reflected off the sheet and a "b" value related to yellowness (+) or blueness (−) reflected off the sheet. Formation is a measure of the uniformity of the fiber distribution through the web of the bonded nonwoven fabric. A skilled tester visually compared control samples (standards) of nonwovens exhibiting different degrees of fiber distribution uniformity with the fabric to be evaluated. A score was given between 5 for very good formation to 1 for very poor formation. Air permeability was measured generally according to ASTM D-737. Air permeability is the rate of airflow through a material under a pressure differential between the two fabric surfaces.

Example 2

15% Reclaim Control

The spunbond machine described in Example 1 was used to produce a spunbond nonwoven fabric of approximately 0.4 ounce per square yard (13.8 grams per square meter) overall basis weight. In beams A and C the polymer component that became the sheath of the bicomponent filament was comprised of virgin polypropylene resin (EXXON PP 3511). In beam A and C the polymer component that became the core of the bicomponent filament was also comprised of virgin polypropylene resin (EXXON PP 3155). Beam B was supplied with a homogeneous blend of 85% virgin polypropylene (Exxon PP 3155) and 15% reclaimed polypropylene recovered from previously spun polypropylene fiber or webs comprised of previously spun polypropylene fiber. This polymer was supplied to both the sheath and the core of the resulting spun filaments. The resulting web, not part of our invention, was bonded as in Example 1 and was tested to obtain the data provided in Table 1 labeled Example 2.

Example 3

Bicomponent with 100% Reclaim in Core

The spunbond machine described in Example 1 was used to produce a spunbond nonwoven web of 0.4 ounce per square yard (13.9 gram per square meter) overall basis weight containing reclaimed polypropylene. In beam A and B the polymer component that became the sheath of the bicomponent filament was comprised of virgin polypropylene resin (EXXON PP 3155). In beam A and B the polymer component that became the core of the bicomponent filament was comprised of 100% reclaimed polypropylene recovered from previously spun polypropylene fibers or webs comprised of previously spun polypropylene fiber. Beam C was operated with virgin polypropylene resin (Exxon PP 3155) supplied to both the sheath and core portion, so that the resulting filaments were comprised of 100% virgin polypropylene. The resulting web, a product of our invention, after bonding and surfactant treatment as in Example 1, was tested to supply the data shown in Table 1 to compare with the control fabric of Example 1 made under the same conditions but with 100% virgin polypropylene. The results summarized in Table 1 show that the web of Examples 1 and 3 are similar in critical properties. Thus, the product of Example 3 is fit for use as topsheet in adult incontinent products.

Example 4

Control

The product of Example 4 was made as described in Example 1 above using 100% virgin polypropylene resin (Exxon PP 3155), except that bonding was achieved using a calender roll comprising 144 embossing points per square inch and 18% bond area. The three beams cooperated to produce approximately equal output to yield a final web basis weight of 0.7 ounces per square yard (23 grams per square meter). The fabric properties of Example 4 are summarized in Table 1. This product is supplied for use as topsheet in the manufacture of baby diapers.

Example 5

15% Reclaim Control

The product of Example 5 was made as described in Example 2 above, except that bonding was achieved using a calender roll having 144 embossing points per square inch and 18% bond area. The three beams cooperated to produce approximately equal output to yield a final basis weight of 0.65 ounce per square yard (22.1 grams per square meter). Properties of the product of Example 5 are summarized in Table 1.

Example 6

Bicomponent with 100% Reclaim in Core

Example 6, a product of our invention, was made as described in Example 3 above, except that bonding was achieved using a calender roll having 144 embossing points per square inch and 18% bond area. The three beams cooperated to produce approximately equal output to yield a final basis weight of 0.65 ounce per square yard (22.1 grams per square meter). Properties of the product of Example 6 are summarized in Table 1.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for producing spunbond nonwoven fabric, comprising the steps of:
separately melting two or more polypropylene polymer components, at least one component including reclaimed polypropylene recovered from previously spun polypropylene fiber or webs comprised of previously spun polypropylene fiber, and wherein at least one component comprises virgin polymer
separately directing the two or more molten polypropylene polymer components through a distribution plate configured so that the separate molten polymer components combine at a multiplicity of spinnerette orifices to form bicomponent filaments containing the two or more polymer components, the polymer components being arranged in a sheath-core cross-sectional configuration, with the polymer component containing reclaimed polypropylene being present in the core, and the reclaimed polypropylene being in an amount up to 100% by weight, and with the total amount of reclaimed polypropylene in the filaments being 25% by weight or greater;
extruding the multicomponent filaments from the spinnerette orifices into a quench chamber;
directing quench air from a first independently controllable blower into the quench chamber and into contact with the filaments to cool and solidify the filaments;
directing the filaments and the quench air into and through a filament attenuator and pneumatically attenuating and stretching the filaments;
directing the filaments from the attenuator into and through a filament depositing unit;
depositing the filaments from the depositing unit randomly upon a moving continuous air-permeable belt to form a nonwoven web of substantially continuous filaments;
applying suction from a second independently controllable blower beneath the air-permeable belt so as to draw air through the depositing unit and through the air-permeable belt; and

TABLE 1

| PRODUCT | | EXAMPLE-1 AVER | EXAMPLE-1 STD. DEV | EXAMPLE-2 AVER | EXAMPLE-2 STD. DEV. | EXAMPLE-3 AVER | EXAMPLE-3 STD. DEV | EXAMPLE-4 AVER | EXAMPLE-4 STD. DEV. | EXAMPLE-5 AVER | EXAMPLE-5 STD. DEV. | EXAMPLE-6 AVER | EXAMPLE-6 STD. DEV. |
|---|---|---|---|---|---|---|---|---|---|---|---|---|---|
| BASIS WEIGHT | (g/m$^2$) | 13.79 | 0.33 | 13.85 | 0.32 | 13.86 | 0.31 | 22.98 | 0.41 | 22.13 | 0.46 | 21.95 | 0.58 |
| STRIP TENSILE—MD | (g/cm) | 523 | 70 | 500 | 73 | 490 | 64 | 749 | 86 | 735 | 80 | 608 | 69 |
| STRIP ELONGATION—MD | (%) | 43 | 9 | 44 | 7 | 55 | 8 | 60 | 8 | 58 | 8 | 55.6 | 8 |
| STRIP TEA TOUGHNESS—MD | (cm-gm/cm$^2$) | 197 | 39 | 191 | 43 | 202 | 52 | 207 | 66 | 297 | 63 | 248 | 52 |
| STRIP TENSILE—CD | (gm/cm) | 238 | 45 | 247 | 66 | 275 | 61 | 493 | 77 | 486 | 73 | 400 | 66 |
| STRIP ELONGATION—CD | (%) | 46 | 8 | 47 | 10 | 56 | 10 | 58 | 11 | 60 | 9 | 57 | 9 |
| STRIP TEA TOUGHNESS—CD | (cm-gm/cm$^2$) | 98 | 25 | 105 | 32 | 118 | 38 | 198 | 52 | 198 | 46 | 164 | 41 |
| STRIKE THROUGH | (seconds) | 2.18 | 0.42 | 2.13 | 0.19 | 2.26 | 0.4 | 2.11 | 0.26 | 1.99 | 0.21 | 2.07 | 0.24 |
| REWET | (gm) | 0.14 | 0.03 | 0.13 | 0.02 | 0.16 | 0.02 | 0.11 | 0.02 | 0.11 | 0.01 | 0.12 | 0.02 |
| HUNTER COLOR—L | | 96.6 | 0.33 | 96.32 | 0.41 | 96.52 | 0.38 | 97.08 | 0.34 | 97.04 | 0.46 | 96.76 | 0.46 |
| HUNTER COLOR—a | | −0.38 | 0.09 | −0.27 | 0.05 | −0.31 | 0.05 | −0.39 | 0.11 | −0.33 | 0.04 | −0.48 | 0.34 |
| HUNTER COLOR—b | | 0.52 | 0.08 | 1.04 | 0.28 | 0.95 | 0.15 | 0.46 | 0.22 | 0.88 | 0.2 | 1.02 | 0.26 |
| FORMATION | | 3.66 | 0.48 | 3.17 | 0.4 | 3.1 | 0.3 | 3.98 | 0.2 | 3.95 | 0.25 | 3.99 | 0.08 |
| AIR PERMEABILITY | (f$^3$/f$^2$/min) | 917 | 53 | 930 | 48 | 884 | 46 | 693 | 30 | 672 | 26 | 701 | 37 |
| AIR PERMEABILITY COEFFICIENT OF VARIATION | | 5.8 | | 5.2 | | 5.2 | | 4.3 | | 3.9 | | 5.3 | |
| AIR PERMEABILITY NO. OF TESTS | | 88 | | >20 | | >20 | | 152 | | >20 | | >20 | | directing the web through a bonder and bonding the filaments to convert the web into a coherent nonwoven fabric.

2. The process according to claim 1, wherein the polymer component forming the core is formed entirely of said reclaimed polypropylene.

3. The process according to claim 2, wherein the sheath is formed entirely of virgin polypropylene.

4. The process according to claim 2, wherein the sheath is formed of a blend of virgin polypropylene and reclaimed polypropylene recovered from previously spun polypropylene fiber or webs comprised of previously spun polypropylene fiber.

5. A process for producing a spunbond nonwoven fabric, comprising the steps of:

separately melting a first polymer component comprising virgin polypropylene and a second polymer component comprising reclaimed polypropylene recovered from previously spun polypropylene fiber or webs comprised of previously spun polypropylene fiber, and wherein at least one component comprises virgin polymer separately directing the first and second molten polymer components through a distribution plate configured so that the separate molten polymer components combine at a multiplicity of spinnerette orifices to form bicomponent filaments containing a core of the second polymer component and a surrounding sheath of the first polymer component, with the core containing reclaimed polypropylene in an amount up to 100% by weight, and with the total amount of reclaimed polypropylene in the filaments being 25% or greater;

extruding the bicomponent filaments from the spinnerette orifices into a quench chamber;

directing quench air from a first independently controllable blower into the quench chamber and into contact with the filaments to cool and solidify the filaments;

directing the filaments and the quench air into and through a filament attenuator and pneumatically attenuating and stretching the filaments;

directing the filaments from the attenuator into and through a filament depositing unit;

depositing the filaments from the depositing unit randomly upon a moving continuous air-permeable belt to form a nonwoven web of substantially continuous filaments;

applying suction from a second independently controllable blower beneath the air-permeable belt so as to draw air through the depositing unit and through the air-permeable belt; and directing the web through a bonder and bonding the filaments to convert the web into a coherent nonwoven fabric.

6. A process according to claim 5, wherein the second polymer component has a melt flow rate at least 5 units greater than that of the first polymer component.

7. A process according to claim 5, wherein the core is formed entirely of said reclaimed polypropylene.

8. A process for producing a spunbond nonwoven fabric, comprising the steps of:

reclaiming polypropylene from previously spun polypropylene fiber or webs comprised of previously spun polypropylene fiber to produce a second polymer component that has been subjected to at least two heat histories in which the polymer has been melted and resolidified;

separately melting a first polymer component comprising virgin polypropylene and the second polymer component comprising the reclaimed polypropylene;

separately directing the first and second molten polymer components through a distribution system configured so that the separate molten polymer components combine at a multiplicity of spinnerette orifices to form bicomponent filaments containing a core of the second polymer component and a surrounding sheath of the first polymer component, with the core containing reclaimed polypropylene in an amount up to 100% by weight, and with the total amount of reclaimed polypropylene in the filaments being 25% by weight or greater;

extruding the bicomponent filaments from the spinnerette orifices into a quench chamber;

directing quench air into the quench chamber and into contact with the filaments to cool and solidify the filaments;

directing the filaments and the quench air into and through a filament attenuator and pneumatically attenuating and stretching the filaments;

directing the filaments from the attenuator into and through a filament depositing unit;

depositing the filaments from the depositing unit randomly upon a moving continuous air-permeable belt to form a nonwoven web of substantially continuous filaments; and directing the web through a bonder and bonding the filaments to convert the web into a coherent nonwoven fabric.

9. A process for producing spunbond nonwoven fabric, comprising the steps of:

separately melting a first polymer component comprising virgin polypropylene and a second polymer component comprising reclaimed polypropylene recovered from previously spun polypropylene fiber or webs comprised of previously spun polypropylene fiber, wherein the second polymer component has been previously been subjected to at least two heat histories in which the polymer has been melted and resolidified;

separately directing the first and second molten polymer components to a spin beam assembly equipped with spin packs assembled from a series of plates sandwiched together, including a top plate having inlet ports for receiving the first and second molten polymer components, a metering plate having flow distribution apertures formed therein arranged for distributing the separate first and second molten polymer components, a spinnerette plate having a multiplicity of spinnerette orifices, and upstream from the spinnerette plate, a distribution plate which forms channels configured so that the separate molten polymer components combine at said spinnerette orifices to form bicomponent filaments containing the first and second polymer components, the polymer components being arranged in a sheath-core cross-sectional configuration, with the polymer component containing reclaimed polypropylene being present in the core, and the reclaimed polypropylene being in an amount up to 100% by weight, and with the total amount of reclaimed polypropylene in the filaments being 25% by weight or greater;

extruding the multicomponent filaments from the spinnerette orifices into a quench chamber;

directing quench air from a first independently controllable blower into the quench chamber and into contact with the filaments to cool and solidify the filaments;

directing the filaments and the quench air into and through a filament attenuator and pneumatically attenuating and stretching the filaments;

directing the filaments from the attenuator into and through a filament depositing unit;

depositing the filaments from the depositing unit randomly upon a moving continuous air-permeable belt to form a nonwoven web of substantially continuous filaments;

applying suction from a second independently controllable blower beneath the air-permeable belt so as to draw air through the depositing unit and through the air-permeable belt; and directing the web through a bonder and bonding the filaments to convert the web into a coherent nonwoven fabric.

10. A process for producing a spunbond nonwoven fabric, comprising the steps of:

reclaiming polypropylene from previously spun polypropylene fiber or webs comprised of previously spun polypropylene fiber to produce a second polymer component that has been subjected to at least two heat histories in which the polymer has been melted and resolidified;

separately melting a first polymer component comprising virgin polypropylene and the second polymer component comprising the reclaimed polypropylene;

separately directing the first and second molten polymer components to a spin beam assembly equipped with spin packs assembled from a series of plates sandwiched together including a spinnerette plate having a multiplicity of spinnerette orifices having a density of at least 3000 orifices per meter of length of the spin beam, and upstream from the spinnerette plate, a thin etched distribution plate which forms channels configured so that the separate molten polymer components combine at said spinnerette orifices to form bicomponent filaments containing a core of the second polymer component and a surrounding sheath of the first polymer component, with the core containing reclaimed polypropylene in an amount up to 100% by weight, and with the total amount of reclaimed polypropylene in the filaments being 25% by weight or greater;

extruding the bicomponent filaments from the spinnerette orifices into a quench chamber;

directing quench air into the quench chamber and into contact with the filaments to cool and solidify the filaments;

directing the filaments and the quench air into and through a filament attenuator and pneumatically attenuating and stretching the filaments;

directing the filaments from the attenuator into and through a filament depositing unit;

depositing the filaments from the depositing unit randomly upon a moving continuous air-permeable belt to form a nonwoven web of substantially continuous filaments; and directing the web through a bonder and bonding the filaments to convert the web into a coherent nonwoven fabric.

* * * * *